United States Patent [19]
Zucker et al.

[11] 4,093,374
[45] June 6, 1978

[54] MULTIPLE RANGE VARIABLE MAGNIFICATION REPRODUCTION MACHINE

[75] Inventors: Edwin Zucker, Rochester; David K. Shogren, Ontario; David N. Redden, Penfield, all of N.Y.

[73] Assignee: Xerox Corporation, Stamford, Conn.

[21] Appl. No.: 647,941

[22] Filed: Jan. 12, 1976

[51] Int. Cl.[2] ...................... G03B 27/34; G03B 27/40; G03B 27/70

[52] U.S. Cl. ........................................ 355/57; 355/58; 355/65

[58] Field of Search .................. 355/8, 51, 57, 58, 65, 355/66

[56] References Cited

U.S. PATENT DOCUMENTS

| | | | |
|---|---|---|---|
| 3,884,574 | 5/1975 | Doi et al. | 355/8 X |
| 3,897,148 | 7/1975 | Ritchie et al. | 355/58 X |
| 4,007,986 | 2/1977 | Komori et al. | 355/8 X |

*Primary Examiner*—Richard A. Wintercorn

[57] ABSTRACT

A document reproduction machine having a multiple range of magnifications employs a scanning optical system which is controlled as to scanning speed and distance of travel by the selected magnification. In the higher reduction copying ranges the speed of the scanning optical system is automatically increased in proportion to the selected magnification reduction, but the increase in scanning distance is limited to the platen size. Multiple cams are employed for each range of magnification, and means are provided to change the scanning drive means between the multiple cams.

24 Claims, 3 Drawing Figures

MULTIPLE RANGE VARIABLE MAGNIFICATION REPRODUCTION MACHINE

BACKGROUND OF THE INVENTION

1. Field of the Invention

The invention is in the field of variable magnification reproduction machines.

2. Description of the Prior Art

Variable magnification reproduction machines are known in the prior art as exemplified by U.S. Pat. Nos. 3,542,467, 3,614,574, 3,778,147, 3,884,574 and 3,897,148. In U.S. Pat. No. 3,897,148, for example, discrete values of magnification are provided in a lens scanning apparatus wherein each of a plurality of cams corresponds to a single, discrete value of magnification. In machines having scanning optical systems, the selection of a desired magnification value is generally associated with a corresponding selection of optical scanning speed and distance of travel. Such correspondence is particularly present in machines using a photoreceptive surface moving at constant speeds. In such machines, to obtain smaller magnification ratios, one generally scans a document at a faster rate and also extends the distance of travel so that a larger document may be reproduced using the available photoreceptive surface. The minimum magnification value in such machines is dictated by the platen size in the scan direction.

It is also known to switch and selectively terminate platen document scanning of constant velocity scanning means prematurely for smaller documents in a fixed magnification copier, e.g. the Xerox Corporation "1000" copier.

Extending the magnification range to include still smaller magnification values has not generally been possible because of the physical size limits on the platen and reproduction machine itself and limitations of space and cost for discrete cams as in the Xerox Corporation "X7000". In particular, the combination of a relatively small or conventional platen size together with small values of magnification points toward conflicting design requirements.

One method and apparatus for extending the magnification range is disclosed in co-pending United States application, Ser. No. 590,906 filed June 27, 1975, the whole of which application is incorporated herein by reference. The co-pending application discloses an imaging means, such as a fixed focal length lens, which is adjusted to provide a selected magnified image of an original document on a photoreceptor surface. Cooperating with the imaging means is a cam and a follower arm whose effective radius may be varied in accordance with the selected magnification value. For values of magnification within the extended smaller range of magnifications, the document scanning means increases in velocity across the document original but the extent of travel of the scanning means is terminated at the end of the platen by means of a clutch arrangement. The clutch arrangement is automaticallly activated for the smaller magnification values, and is not utilized for the larger magnification values.

An alternate approach to providing an extended multiple range variable magnification reproduction machine is set forth herein where the clutch assembly described in the aforementioned co-pending application is replaced by a multiple cam arrangement, each cam providing a continuous range of magnification values. Thus, the instant apparatus is not limited to discrete values of magnification as is the apparatus described in U.S. Pat. No. 3,897,148 mentioned above, but rather continuous ranges of magnification are provided.

SUMMARY OF THE INVENTION

It is therefore an object of the invention to overcome the disadvantages of the prior art by providing an extended variable magnification range in a reproduction machine while utilizing a platen of conventional size.

Another object of the invention is to provide a range of relatively small magnification ratios in a reproduction machine which utilizes a fixed photoreceptor travel speed.

Another object of the invention is to provide a multiple cam driven scanning means in a variable magnification reproduction machine.

Yet another object of the invention is to provide a scan distance limiting means in a variable magnification reproduction machine which employs a scanning system which generally increases the speed and travel distance of optical elements with decreasing magnification.

The variable magnification reproduction machine has a platen for holding a document, a document scanning means for scanning a document at said platen, the document scanning means comprising a plurality of separate cam surfaces for driving cam follower means. An image receptor means receives an image from the document scanned by the document scanning means, and imaging means are provided for focusing an image of the document onto the receptor means. Means are provided for simultaneously adjusting the imaging means for selecting between different document magnifications and for changing the scanning rate of the document scanning means in accordance with the selected magnification. Further, means responsive to the selected magnification are provided for selecting one of the cam surfaces for driving the cam follower means.

BRIEF DESCRIPTION OF THE DRAWINGS

These and other objects of the invention will be apparent from the following detailed description taken in conjunction with the figures wherein.

DETAILED DESCRIPTION OF THE PREFERRED EMBODIMENT

The variable magnification reproduction machine of the instant invention may be utilized to provide a continuously selectable magnification within a range set by machine size and physical requirements. Magnification may be defined as the ratio between the image or copy dimension and the object or document dimension. In the preferred embodiment described below, the magnification range is nominally 1.1 – 0.6. Magnifications less than unity represent physical reductions in size. Thus, a document having a dimension of 11 inches × 17 inches may be reduced using a magnification ratio of 0.647 to fit onto copy paper having a size of 8.5 inches × 11 inches.

Figure 1:
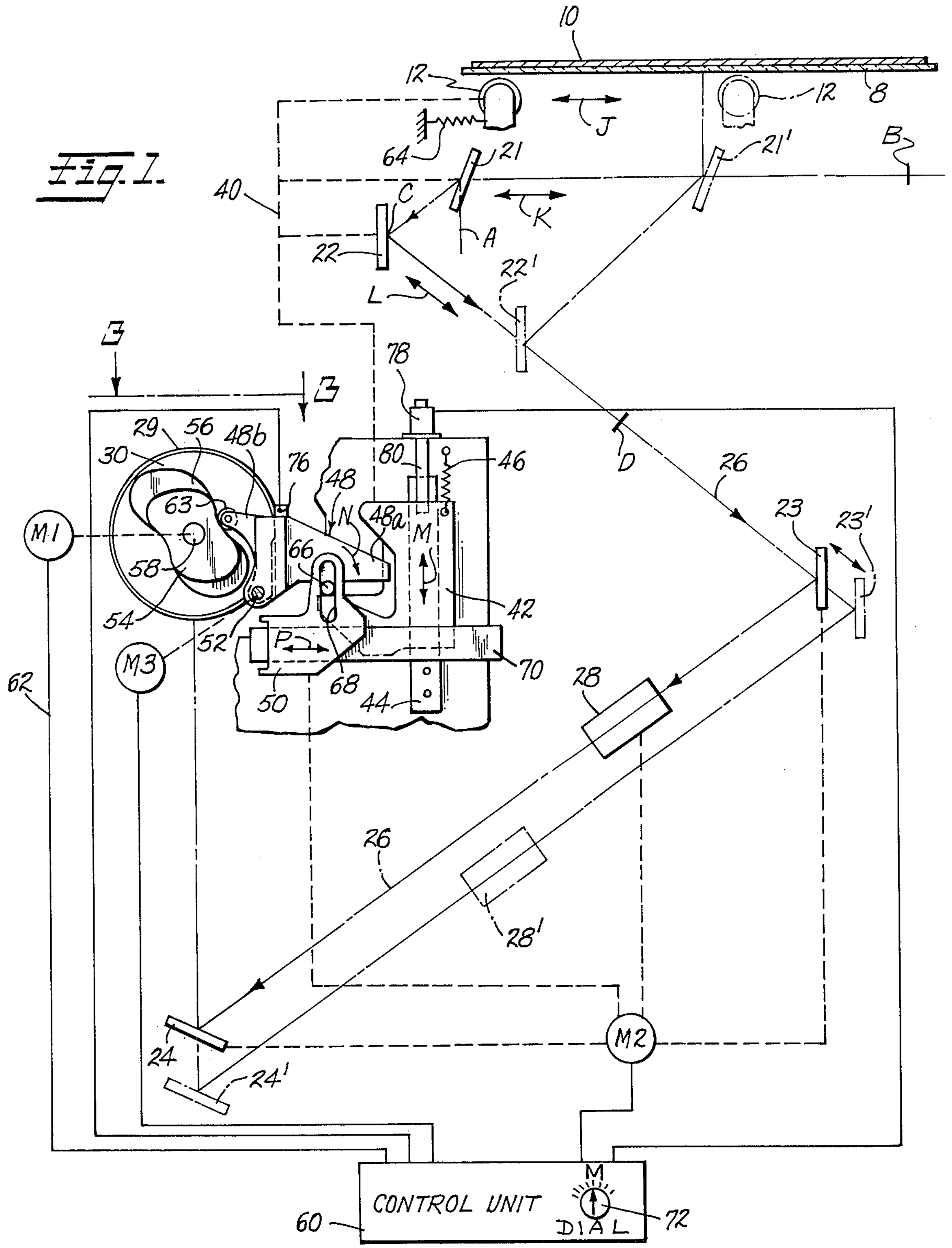
FIG. 1 is a representative view showing the principal optical and mechanical elements of the invention.

FIG. 1 is a representative view of the principal optical and mechanical elements of the instant invention.

For the sake of clarity dotted lines have been utilized to show the interconnection of motors and their corresponding driven elements and to indicate the different positions of various optical elements. For a more detailed description of the mechanical supports and drive elements reference is made to the aforementioned co-pending application.

As shown in FIG. 1, the apparatus has a document holding means comprising a platen 8 on which a document 10 is positioned and illuminated for reproduction. The document is illuminated by a lamp 12 which scans across the surface of the platen as illustrated by the arrow J. The optical system comprises first, second, third and fourth mirrors designated 21, 22, 23 and 24, respectively. Mirrors 21 and 22 are scanning mirrors in that they move relative to the document 10 in synchronism with the movement of lamp 12. The arrows K and L adjacent mirrors 21 and 22, respectively, indicate the direction of scan for these mirrors. The optical path of light reflected from the mirror surfaces is indicated by numeral 26 and is seen to extend from the document 10 to scanning mirrors 21 and 22 and subsequently to mirror 23. A lens 28, for example, of the fixed focal length type, is positioned to intersect the light path 26, and the light image is subsequently reflected by means of mirror 24 to a photoreceptor surface 29 of, for example, a xerographic drum 30.

FIG. 1 also illustrates a second position for the scanning mirrors which is designated by numerals 21' and 22' corresponding to an intermediate point in the scan cycle. During one complete scan cycle, the mirror 21 moves from its start of scan position at point A to a point B which depends on the magnification setting, and back again to the start of scan position. At the same time, and in synchronism therewith, mirror 22 moves from its starting position at point C to point D, which likewise depends on the magnification setting, and returns along the same path to point C. As can be seen in the drawings, the angular orientation of mirrors 21 and 22 remains fixed during a scan cycle and only their displacement relative to the document surface is changing. The attitude of the optical path 26 extending from mirrors 22 to mirror 23 remains fixed in position for any given displacement of the mirrors 21 and 22. The geometry shown provides a constant optical path length from the platen 8 to the lens 28 during every position of the scanning mirrors 21 and 22 during the scan cycles. As such, the horizontal component of the velocity of mirror 22 is one-half the velocity of scanning mirror 21.

FIG. 1 further shows the lens and mirror arrangement for a different magnification setting of the reproduction machine. Thus, numeral 23' indicates the position of mirror 23 at an alternative magnification value as does numeral 28' and 24' indicate the new position for the lens 28 and mirror 24, respectively. The movement of mirrors 23 and 24 and lens 28 is continuously variable to achieve continuously variable magnification within the available range. Lens 28 has a fixed focal length, 14 inches, for example, and the lens and mirror arrangement maintain a focused image on the receptor means or photoreceptive surface 29 in a variable conjugate system. The mirror and lens movement is achieved by means of a common drive mechanism and separate cam arrangements as is described in detail in the aforementioned co-pending application.

Mirrors 21 and 22 together with the lamp 12 are mechanically linked together as indicated by line 40 to be driven by a trolley 42. Trolley 42 is mounted on a rail 44 for reciprocating movement as shown by the arrow M. The rail 44 is fixed on a suitable support attached to the machine housing. The trolley 42 is biased by a spring 46 to move in an upward direction along rail 44. As shown in FIG. 1, trolley 42 is positioned near the limit of its upward travel. The downward motion of trolley 42 results from the action of cam follower means 48 in cooperation with a yoke 50. Cam follower means 48 is shown as a single cam follower arm having two portions identified by numerals 48*a* and 48*b*. Both cam follower arm portions 48*a* and 48*b* are pivoted for rotation about a shaft or fulcrum screw 52 (see also FIG. 3). Both portions 48*a* and 48*b* pivot in a clockwise direction as shown by the arrow N during document scanning. The cam follower means 48 is driven by one of a plurality of cams which, for the sake of illustration is shown by a first cam 56 and a second cam 54. Each cam is mounted on a common drive shaft 58 which is also connected for rotating the xerographic drum 30. Drive shaft 58 is powered by a motor M1 which is connected to a control unit 60 of the apparatus along line 62. Rotation of drive shaft 58 renders the control unit 66 inoperative to produce further changes in magnification.

Rotation of drive shaft 58 (in a clockwise direction) thus produces a clockwise rotation of cam follower means 48 via the cam follower arm roller 63 which makes contact with the cam surfaces. The clockwise pivot of cam follower arm in turn causes a downward movement of trolley 42 and a corresponding scanning movement of mirrors 21 and 22 as well as lamp 12. After document scanning, the cam follower means 48 is pivoted in a counterclockwise direction by the bias force supplied from trolley 42 via spring 46. Additional "flyback" biasing is provided by addition spring means 64 shown attached between lamp 12 and the apparatus housing.

The mechanical connection between the trolley 42 and the cam follower means 48 is provided by a roller 66 housed in a slot 68 of yoke 50. Yoke 50 is mounted for slidable movement along a rail 70 along the direction indicated by arrows P. Rail 70 is appropriately fixed to the apparatus housing.

To produce a change in magnification, the operator moves a dial 72 on the control unit 60. Any value within the available continuous magnification range may be selected inasmuch as the apparatus is not restricted to discrete magnification values.

Upon selecting a magnification value the control unit 60 actuates a motor M2 which drives the mirrors 23 and 24 and lens 38 to their appropriate position corresponding to the magnification selected. For example, in decreasing the magnification, lens 28 moves to position 28', mirror 23 to position 23' and mirror 24 to position 24'. At the same time, motor M2 drives the yoke 50 along rail 70 so that roller 66 makes contact with a portion of the cam follower arm portion 48*a* at a larger distance from the pivot point defined by fulcrum screw 52. In so moving the yoke 50, the cam follower arm portion 48*a* has a larger effective radius and therefore drives the trolley 42 at a faster rate producing a corresponding faster rate of document scan. The increase in document scanning rate is appropriate for smaller magnification in that a large reduction ratio is possible and therefore a larger document may be scanned.

Figure 2:
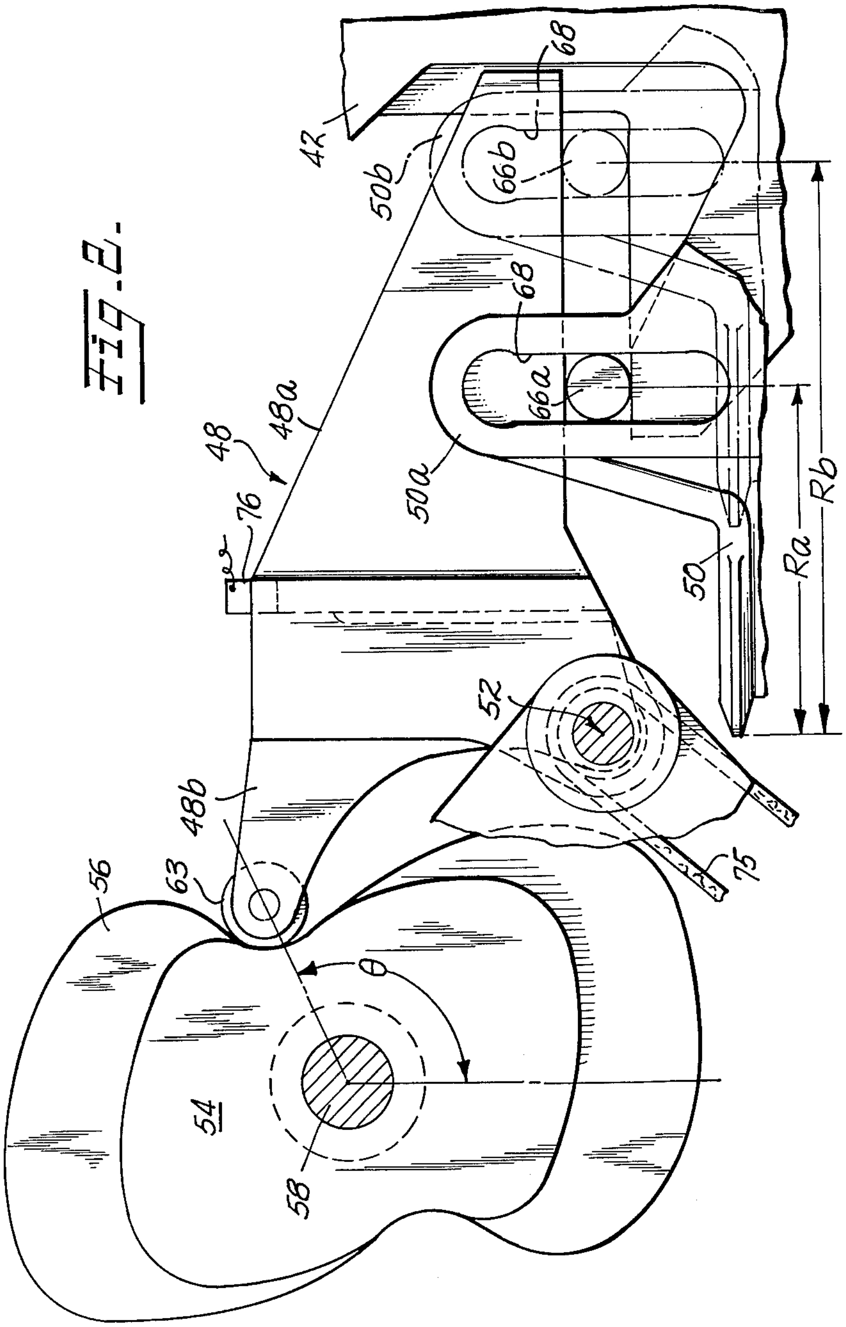
FIG. 2 is a schematic illustration of the yoke and cam follower arm of FIG. 1 for two different values of magnification.

FIG. 2 is a schematic illustration showing more clearly the change in effective radius of cam follower arm portion 48a. Yoke 50 is shown for two different magnifications, $M_a$ and $M_b$, with cam 54 at the position $\theta$ relative to a reference $\theta = O$ position. The yoke is labelled 50*a* and 50*b* corresponding to positions of the yoke for magnification $M_a$ and $M_b$ respectively where $M_b < M_a$. Yoke 50 is positioned as a function of magnification to change the effective arm radius R of the cam follower arm portion 48*a*. R is defined as the distance from the center of the rotation of cam follower arm portion 48*a* measured normally to the slot 68 in yoke 50, which constrains motion of roller 66 to straight line motion (as is the motion of trolley 42).

In changing magnification, it is desirable to maintain the same registration position on the platen so that the operator may utilize the same registration guides for all values of magnification. When magnification is changed, the yoke is positioned so that R is inverse to magnification, i.e. $R_b/R_a = M_a/M_b$. To achieve common registration for all values of R ($R = R_a$ or $R = R_b$), it is necessary to maintain the optical axis located at the registration position when the cam 54 is at position $\theta$. To maintain this relationship, cam follower arm portion 48*a* is shaped such that at position $\theta$, a line extending through the center of fulcrum screw 52 and roller 66 is perpendicular to the slot in yoke 50. This arrangement satisfies the unique requirement of an optical scanning device with variable magnification that scan velocity be equal to photoreceptor velocity divided by magnification, and with initiation of constant velocity optical scanning (i.e. document registration position) invariable with magnification.

The use of a single cam, such as first cam 56 in cooperation with yoke 50 and trolley 42 provides a first range of continuous magnifications. A second range of continuous magnification is achieved by using the second cam 54 to drive the cam follower means 48. Portions of the cam surfaces of cams 54 and 56 may have identical shapes to achieve a continuous transition of magnification values between the first and second ranges while maintaining a continuous relationship $R_b/R_a = M_a/M_b$ regardless of range. The apparatus thus provides a means for selecting the appropriate cam 54 and 56 for the magnification desired.

Figure 3:
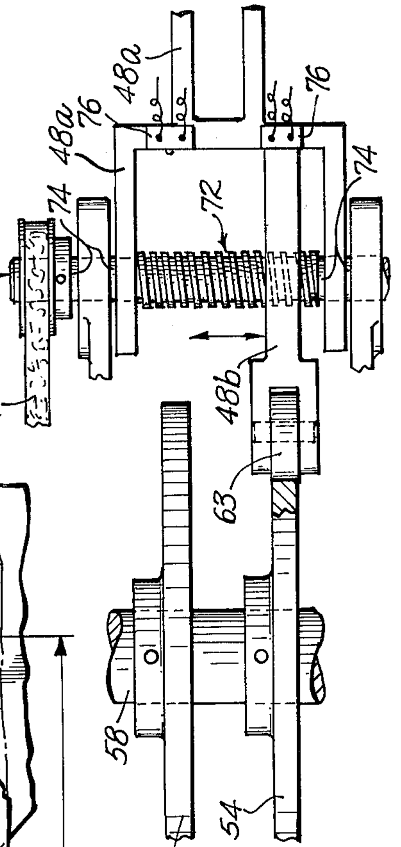
FIG. 3 is an enlarged top view of FIG. 1 taken along line 3—3 thereof.

Means for selecting the appropriate cam 54 and 56 comprises means for moving cam follower means 48 with respect to the cams 54 and 56. For this purpose, as shown in FIG. 3, there is provided the fulcrum screw 52 which has a threaded portion 72 and a non-threaded or smooth portion 74. Cam follower arm portion 48*b* is pivoted about fulcrum screw 52 by means of a threaded aperture which mates with the threaded portion 72 of fulcrum screw 52. Consequently, upon the rotation of the fulcrum screw 52 relative to cam follower arm portion 48*a*, the portion 48*b* of cam follower arm 48 is forced to move axially along the length of the screw 52 and therefore moves relative to the fixed axial position of the cams 54 and 56 along drive shaft 58. Fulcrum screw 52 is rotated by means of a belt drive 75 connected to a motor M3 which is energized by the control unit 60. The position of the portion 48*b* of the cam follower arm 48 is detected by means of microswitches 76 attached to the portion 48*a* so as to be activated upon alignment with the appropriate desired cam. Signals from the microswitches are fed to the control unit 60 to subsequently de-energize motor M3 when the desired position has been reached.

It is thus seen that portion 48*a* of cam follower arm 48 does not move along the axial direction upon rotation of the fulcrum screw 52 inasmuch as the smooth portions 74 of the fulcrum screw pass through smooth apertures in the portion 48*a* of the cam follower means 48. Thus, cam follower portion 48*b* moves axially with respect to the cam follower portion 48*a*.

Inasmuch as cams 54 and 56 have different shapes for a substantial portion of their rotational direction, it is not always possible to longitudinally move the portion 48*b* of the cam follower means 48 by means of fulcrum screw 52 unless the cam follower means is lifted away from the cam surfaces of cams 52 and 54. In order to achieve a slight separation of the portion 48b from the cams 54 and 56 before changing from one cam to another, the entire cam follower means 48 is rotated clockwise while the drive shaft 58 is held stationary near the start of scan position. To achieve this relatively small clockwise rotation of cam follower means 48, a solenoid 78 is fixed to a housing of the apparatus adjacent the trolley 42. Thus, prior to actuating the motor M3, the solenoid 78 is energized by the control unit 60 thereby extending a plunger 80 of solenid 78 as shown by the dotted line in FIG. 1. Extension of the plunger 80 forces the trolley 42 to travel downward along the rail 44. In practice, it is only necessary to move trolley 42 at a small amount (approximately 1–2 millimeters) in order to cause the necessary small rotation of the cam follower means 48. Cam follower means 48 is rotated clockwise by gravitational forces when the trolley 42 is moved downward. Alternately, a small spring (not shown) may be provided between the cam follower means 48 and the yoke 50 (or alternately, the machine housing) to maintain a clockwise bias of the cam follower means 48 against the roller 66 and trolley 42. Additionally, a small spring (not shown) may be connected between portions 48a and 48*b* of the cam follower means 48 in order to insure that the portion 48*b* also rotates in a clockwise direction upon the clockwise rotation of portion 48*a*. In practice both portions 48*a* and 48*b* may be made to be gravitationally rotated clockwise when released from their start of scan position.

The magnifications obtained with cam 56 may overlap the upper magnifications obtained with cam 54. It is preferred that the radius R utilized with magnifications common to cam 54 and 56 be identical.

It is thus seen that the utilization of separate cams permits separate but continuous ranges of magnification. The cam surfaces are designed such that a predetermined desired limit of scanning of the document scanning means (mirrors 21 and 22 as well as lamp 12) is not exceeded. Consequently, the use of multiple cam surfaces insures that the document scanning means is limited to traverse a range approximately limited to the size of the platen 8 in the scanning direction. The use of multiple discrete cam surfaces thus provides an alternative method and apparatus of extending the range of magnifications available from the clutch mechanism shown in the aforementioned co-pending application.

In a preferred embodiment one cam is selected to provide continuous values of magnification within the range 1.01 – 0.707, and the second cam provides a range between 0.707 and 0.647. Another preferred magnification range is 1.01 – 0.86 for the first range and 0.86 – 0.707 for the second range. Obviously, additional cams may be utilized to further decrease or increase the magnification values.

It is evident that the principles of the reproduction machine of the instant invention may be incorporated in alternate optical systems such as those disclosed in U.S. Pat. Nos. 3,499,374, and 3,697,166. Thus, the scanning direction need not be at right angles to the axis of revolution of the photoreceptor surface, but may be oriented parallel thereto, or in any other attitude.

It is also evident that a zoom lens may be utilized in place of a fixed focal length lens and that the motor for driving the zoom lens can also drive the document scan regulating means and control the scan length.

Although the invention has been described with reference to the preferred embodiments, it is to be understood that changes and modifications may readily be made by those skilled in the art without deviating from the spirit and scope of the present invention defined by the appended claims.

We claim:

1. A variable magnification reproduction machine comprising:
   - holding means comprising a platen for holding a document;
   - document scanning means including movable mirrors for scanning a document at said platen, said document scanning means comprising cam folllower means and a plurality of separate cam surfaces for driving said cam follower means which, in turn, imparts movement to said movable mirrors,
   - image receptor means for receiving an image of said document scanned by said document scanning means,
   - imaging means for focusing an image of said document onto said receptor means,
   - means for adjusting said imaging means for selecting between different document magnifications,
   - means responsive to said selected magnification for adjusting the scanning rate of said document scanning means in accordance with the selected magnification for each of said plurality of cam surfaces to thereby provide a continuously variable range of document magnifications for each cam surface, and
   - means responsive to the selected magnification for selecting one of said cam surfaces for driving said cam follower means.

2. A variable magnification reproduction machine as recited in claim 1 wherein said means for adjusting said scanning rate is automatically cooperated with the means for adjusting said imaging means.

3. A variable magnification reproduction machine as recited in claim 1 wherein said cam follower means comprises a cam follower arm and said means for selecting one of said cam surfaces comprises means for positioning said cam follower arm and said selected cam surface for contact with one another.

4. A variable magnification reproduction machine as recited in claim 3 wherein said cam follower arm has a variable effective arm radius and said means for adjusting the scanning rate of said document scanning means comprises means for adjusting the effective radius of said cam follower arm.

5. A variable magnification reproduction machine as recited in claim 4 wherein said means for adjusting the effective radius of said cam follower arm is automatically cooperated with means for adjusting said imaging means.

6. A variable magnification reproduction machine as recited in claim 4 wherein said cam follower means comprises a single cam follower arm and said means for selecting one of said cam surfaces comprises means for moving said cam follower arm relative to said cam surfaces.

7. A variable magnification reproduction machine as recited in claim 6 wherein said cam surfaces are secured for rotation to a common shaft and spaced axially from one another and said cam follower arm is secured for rotation about a shaft disposed substantially parallel to said common shaft.

8. A variable magnification reproduction machine as recited in claim 7 wherein said cam follower arm comprises a first part secured for axial movement along said shaft and for pivotal movement about said shaft and a second part secured for pivotal movement about said shaft, said means for moving said cam follower arm relative to said cam surfaces comprising means for axially moving said first part relative to said cam surfaces.

9. A variable magnification reproduction machine as recited in claim 8 wherein said means for moving said cam follower arm further comprises means for pivoting said first and second parts about said shaft.

10. A variable magnification reproduction machine as recited in claim 9 wherein said document scanning means comprises a trolley mounted for reciprocal movement for driving document scanning means, said trolley driven by said cam follower arm and in contact with said second part of said cam follower arm.

11. A variable magnification reproduction machine as recited in claim 10 wherein said means for pivoting said first and second parts of said cam follower arm comprises means for moving said trolley, said trolley moving means independent of said cam follower arm.

12. A variable magnification reproduction machine as recited in claim 11 wherein said second part of said cam follower arm is pivotally rotated by gravitational forces upon movement of said trolley by said trolley moving means.

13. A variable magnification reproduction machine as recited in claim 12 wherein said first part of said cam follower arm is pivotally rotated by gravitational forces upon movement of said trolley by said trolley moving means.

14. A variable magnification reproduction machine as recited in claim 12 wherein said first part of said cam follower arm is spring biased against said second part.

15. A variable magnification reproduction machine as recited in claim 1 wherein said document scanning means comprises two separate cam surfaces secured for rotation to a common shaft and spaced axially from one another, one of said surfaces operative within one continuous range of magnification and another of said surfaces operative within another continuous range of magnification.

16. A variable magnification reproduction machine as recited in claim 15 wherein said one and another ranges of magnifications overlap.

17. A variable magnification reproduction machine as recited in claim 16 wherein said one range of magnification is approximately 1.01 – 0.707 and the other range of magnification is approximately 0.707 – 0.647.

18. A variable magnification reproduction machine as recited in claim 16 wherein said one range of magnification is approximately 1.01 – 0.86 and the other range of magnification is approximately 0.86 – 0.707.

19. A variable magnification reproduction machine as recited in claim 17 wherein said one and another cam surfaces have same maximum radial dimension for cooperating with said cam follower means for limiting the scanning of said document scanning means to approximately the platen size.

20. A variable magnification reproduction machine as recited in claim 1 wherein each of said plurality of separate cam surfaces cooperate with said cam follower means for limiting the document scanning means to approximately the platen size.

21. A variable magnification reproduction machine as recited in claim 1 wherein said document scanning means further comprises a lamp and reflecting means, said cam follower means has a cam follower arm having a variable effective arm radius for driving said lamp and reflecting means at different scanning rates and said means for adjusting the scanning rate comprises means for adjusting the effective arm radius of said cam follower arm.

22. A variable magnification reproduction machine as recited in claim 21 wherein said plurality of cam surfaces cooperate with said variable effective arm radius for limiting the document scanning means to approximately the platen size.

23. A variable magnification reproduction machine as recited in claim 22 wherein said imaging means comprises a lens, means responsive to the selected magnification for adjusting the lens and said adjusting means automatically cooperating with said means for adjusting the effective arm radius of said cam follower arm.

24. A variable magnification reproduction machine as recited in claim 1 wherein said imaging means is fixed during scanning of said document by said document scanning means.

* * * * *